United States Patent [19]
Nishida et al.

[11] Patent Number: 6,103,177
[45] Date of Patent: Aug. 15, 2000

[54] MASTERING APPARATUS FOR RECORDING ONTO A GLASS MASTER AND METHOD FOR RECORDING ONTO A GLASS MASTER

[75] Inventors: Jun Nishida, Kanagawa-ken; Nobutaka Kikuiri, Tokyo, both of Japan

[73] Assignee: Kabushiki Kaisha Toshiba, Kawasaki, Japan

[21] Appl. No.: 09/203,758

[22] Filed: Dec. 2, 1998

[30] Foreign Application Priority Data

Dec. 2, 1997 [JP] Japan .................................. 9-331584

[51] Int. Cl.[7] .............................. B29C 59/16; H05B 6/00
[52] U.S. Cl. .......................... 264/447; 430/321; 264/400; 264/482; 356/363; 356/373; 356/375; 219/121.68; 219/121.69; 219/121.75; 219/121.82; 216/24; 216/39; 216/65; 216/85; 216/97; 346/107.6
[58] Field of Search ................................ 65/29.11, 29.18, 65/61, 160; 264/400, 482, 447; 356/363, 373, 375; 451/5, 6, 9, 41; 216/24, 39, 97, 65, 85; 219/121.68, 121.69, 121.75, 121.82; 430/321; 346/107.6

[56] References Cited

U.S. PATENT DOCUMENTS

| | | |
|---|---|---|
| 4,556,524 | 12/1985 | Cullis et al. . |
| 4,848,911 | 7/1989 | Uchida et al. ........................ 356/356 |
| 4,964,940 | 10/1990 | Auvert et al. . |
| 5,100,234 | 3/1992 | Ishibashi et al. . |
| 5,830,514 | 11/1998 | Barenboim et al. . |
| 5,882,554 | 3/1999 | Adachi . |
| 5,910,262 | 6/1999 | Baumgart et al. . |
| 5,969,817 | 10/1999 | Ohsawa . |
| 6,004,487 | 12/1999 | Wada et al. . |

OTHER PUBLICATIONS

Y. Kojima et al., Proceedings of the Japan Society for Precission Engineering, Spring meeting 1994, vol. 1, p. 399–400, Mar. 22, 1994.

*Primary Examiner*—Stanley S. Silverman
*Assistant Examiner*—Michael P. Colaianni
*Attorney, Agent, or Firm*—Foley & Lardner

[57] ABSTRACT

A mastering apparatus for recording optical information onto a glass master 6, includes an objective lens 3, a slider 5 for controlling the movement of the objective lens 3 in the tracking direction, a turn table 7 for rotating the glass master 6, a spindle motor 8 for controlling the rotation of the turn table 7, a positioning beam generator 9, a positioning beam detector 10 for detecting a positioning beam reflected and/or diffracted by positioning units 16 and 17 and a slider controller 11 for moving the slider 5 based on the result of reception of a beam at the positioning beam detector 10. The positioning unit 16 is mounted on the vicinity of the objective lens 3, and the positioning unit 17 is mounted on the upper surface of a spindle stationary portion 13. Since the position of the positioning unit 17 is always stable, relative positional deviation between the positioning units 16 and 17 can be accurately detected by detecting the beam diffracted by the positioning units 16 and 17.

17 Claims, 5 Drawing Sheets

MASTERING APPARATUS FOR RECORDING ONTO A GLASS MASTER AND METHOD FOR RECORDING ONTO A GLASS MASTER

BACKGROUND

The present invention relates to a mastering apparatus for recording onto a glass master and a method for recording onto a glass master, that is, to positioning a driving mechanism of an optical system such as an objective lens used for converging a laser beam onto a glass master.

The improvement of the performance of computers and peripheral devices, and the spread of the Internet have increased opportunities to process a mass of data such as image data and sound data, and these developments have been accompanied by a need for recording media in which a mass of data can be recorded.

Optical disks have a greater recording capacity and higher portability than magnetic recording media such as hard disks. For this reason, some kinds of optical disks such as CD-ROM have already widely spread, and DVD-ROMs (Digital Versatile Disk-ROMs) having a recording capacity greater than that of CD-ROMs are expected to spread rapidly in the future.

In general, a manufacture of commercial optical disks such as CD-ROMs and DVD-ROMs (hereinafter referred to as "commercial disks") involves the fabrication of a master commercial disk by injection molding on a glass master.

Since the process of injection molding results in deterioration in the pit shape and the like, the glass master must have precision much higher than a master commercial disk. For example, since the track pitch of disks currently marketed as commercial products is 1 μm or less, positioning accuracy along the radial direction is required on the order of nanometers for a recording apparatus to manufacture the glass masters.

FIGS. 1 and 2 show a schematic configuration of a conventional mastering apparatus for recording on the glass master. A recording beam generator 1 shown in FIGS. 1 or 2 irradiates a laser beam L1 for recording information. The laser beam is modulated by an optical unit 2 and is guided to an objective lens 3. The objective lens 3 forms information signals of the laser beam from the optical unit 2 on a glass master 6 made of glass. The glass master 6 is secured to a turn table 7 with the side (recording side) coated with a resist facing upwards, and the rotation of the turn table 7 is controlled by a spindle motor 8.

The movement of the objective lens 3 in a focusing direction (a direction of an optical axis of the objective lens 3) is controlled by a focusing mechanism 4. The focusing mechanism 4 is mounted on a slider 5 which controls the movement of the objective lens 3 in a tracking direction (a direction parallel with a recording surface of the glass master).

When recording data on the glass master 6, the movement of the objective lens 3 is controlled by the slider 5 and focusing mechanism 4 to form the information signals on the resist-coated side of the glass master 6 while rotating the glass master 6. Exposure recording on the glass master 6 follows a spiral path from the inner circumference toward the outer circumference.

In order to record data on the glass master 6 at a predetermined pitch, it is necessary to measure the moving distance of the objective lens 3 in the tracking direction accurately. In the prior art, this has been done by measuring the moving distance of the slider 5 that moves the objective lens 3 in the tracking direction using a laser interferometer 21 as shown in FIG. 1 or a linear scale 22 as shown in FIG. 2.

However, the laser interferometer 21 shown in FIG. 1 measures the relative distance between an object (e.g., a mirror 23 mounted on the slider 5) and the interferometer 21 by projecting light L3 upon the mirror 23 and detecting light reflected therefrom. When the distance between the interferometer 21 and the object 23 becomes long, the distance traveled by the laser beam back and forth therebetween is also long. The inventors have discovered that this has resulted in a problem in that accuracy is reduced because the laser beam becomes susceptive to the influence of the fluctuation of the air (fluctuation of the atmospheric pressure) and the fluctuation of the temperature.

Further, the focusing mechanism 4 includes a voice coil motor for moving the objective lens 3 in the focusing direction, and it is known that an interactive movement due to use of leaf springs to support mechanism 4 occurs on the voice coil motor in the tracking direction (a direction parallel with a recording surface of the glass master). Such an interactive movement cause a displacement of the objective lens 3 in the tracking direction even if the slider 5 is in a correct position.

Similarly, in the mastering apparatus for recording onto the glass master utilizing a linear scale 22 as shown in FIG. 2, the position of the objective lens 3 in the tracking direction can not be properly controlled due to the interactive movement of the voice coil motor as described above even if the slider 5 is in a correct position. In addition, since the linear scale 22 and objective lens 3 are in positions apart from each other, the positioning accuracy of the objective lens 3 can not be improved even if there is no interactive movement. Because Abbe's errors attribute to the rotation (rolling errors, pitching errors and yawing errors) of the slider 5 during a travel.

The inventors have discovered that the conventional mastering apparatus for recording on the glass master has had a problem in that errors occur in the positioning of the objective lens 3 due to errors in the measurement of the slider 5, errors attributable to the interactive movement of the voice coil motor, Abbe's errors and the like. As a result, errors occur in pitches of tracks formed by recording pits on the glass master 6.

The present invention has been made in view of the above-described points, and a purpose of the invention is to provide a mastering apparatus and method for recording onto a glass master in which an optical system such as an objective lens can be accurately positioned.

SUMMARY OF THE INVENTION

To achieve the above object, the present invention provides a mastering apparatus for recording optical information onto a glass master, comprising a motor for rotating the glass master while recording; an objective lens for focusing a beam spot onto the glass master; a first positioning unit integrally movable with the objective lens; a second positioning unit secured independent of movements of the glass master and the objective lens; a beam emitting device for emitting a positioning beam to the second positioning unit through the first positioning unit; a beam detecting device for detecting the positioning beam passed through the first positioning unit and from the second positioning unit, and, a control unit for positioning the objective lens based on a signal detected by the beam detecting device.

Furthermore, the present invention also provides a method for mastering optical information onto a glass master, by forming an information signal focused using an objective lens onto the glass master, comprising steps of preparing the glass master in a rotatable manner; emitting a positioning beam to a first positioning unit and a second positioning unit, the first positioning unit integrally movable with the objective lens, the second positioning unit secured independent of movements of the glass master and the objective lens; detecting the positioning beam passed through the first positioning unit and from the second positioning unit, and controlling a position of the objective lens based on a signal detected by the detecting step.

Furthermore, the present invention also provides a method of making an optical disk, by forming an information signal focused using an objective lens, comprising steps of preparing a glass master in a rotatable manner, emitting a positioning beam to a first positioning unit and a second positioning unit, the first positioning unit integrally movable with the objective lens, the second positioning unit secured independent of movements of the glass master and the objective lens, detecting the positioning beam passed through the first positioning unit and from the second positioning unit, controlling a position of the objective lens based on a signal detected by the detecting step to manufacture the glass master, and fabricating the optical disk by using the manufactured glass master.

In accordance with one aspect of the invention, the first positioning unit may be disposed adjacent one surface of the glass master and the second positioning unit may be disposed adjacent another surface of the glass master. A light path of the positioning beam may include the glass master, and the glass master may be substantially transparent.

The present invention may include a focus adjusting unit for adjusting the objective lens by moving along a focusing direction. The control unit may produce a signal which moves the objective lens along a direction perpendicular to the focusing direction so as to reduce an interactive movement which is generated when the focus adjusting unit moves the objective lens along the focusing direction.

In accordance with another aspect of the invention, the motor may comprise a stationary portion and a rotating portion having a surface which contacts with one surface of the glass master on which information is not to be recorded.

Both the first positioning unit and the second positioning unit may include a diffraction grating, and the control unit may detect displacement of the objective lens by referring to a diffracted beam passed through the first positioning unit and from the second positioning unit.

Also, the glass master may have a surface coated with a resist and the objective lens may focus the beam spot onto the surface of the glass master.

DETAILED DESCRIPTION OF PREFERRED EMBODIMENT

A mastering apparatus for recording onto a glass master of the present invention will now be specifically described with reference to the accompanying drawings.

Figure 2:
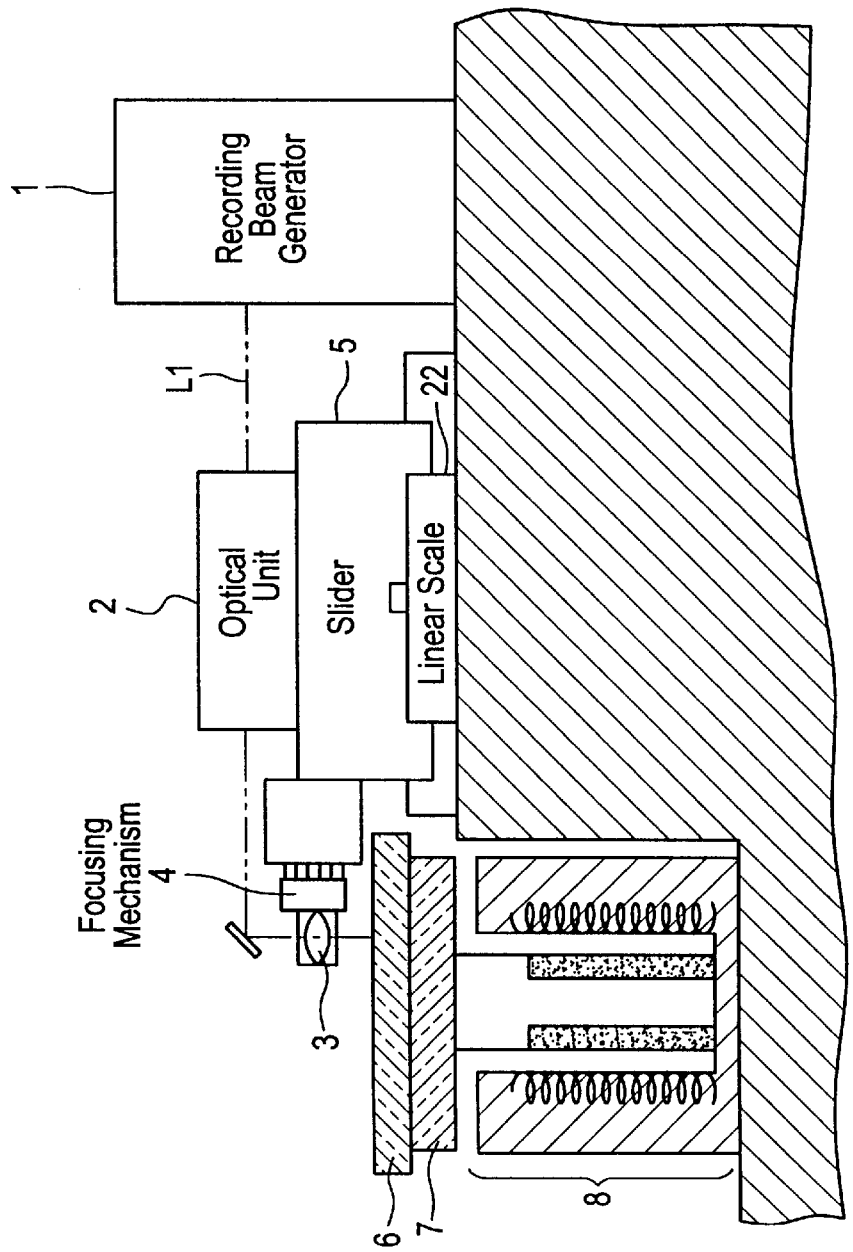
FIG. 2 shows a schematic configuration of another conventional mastering apparatus having a linear scale.
Figure 3:
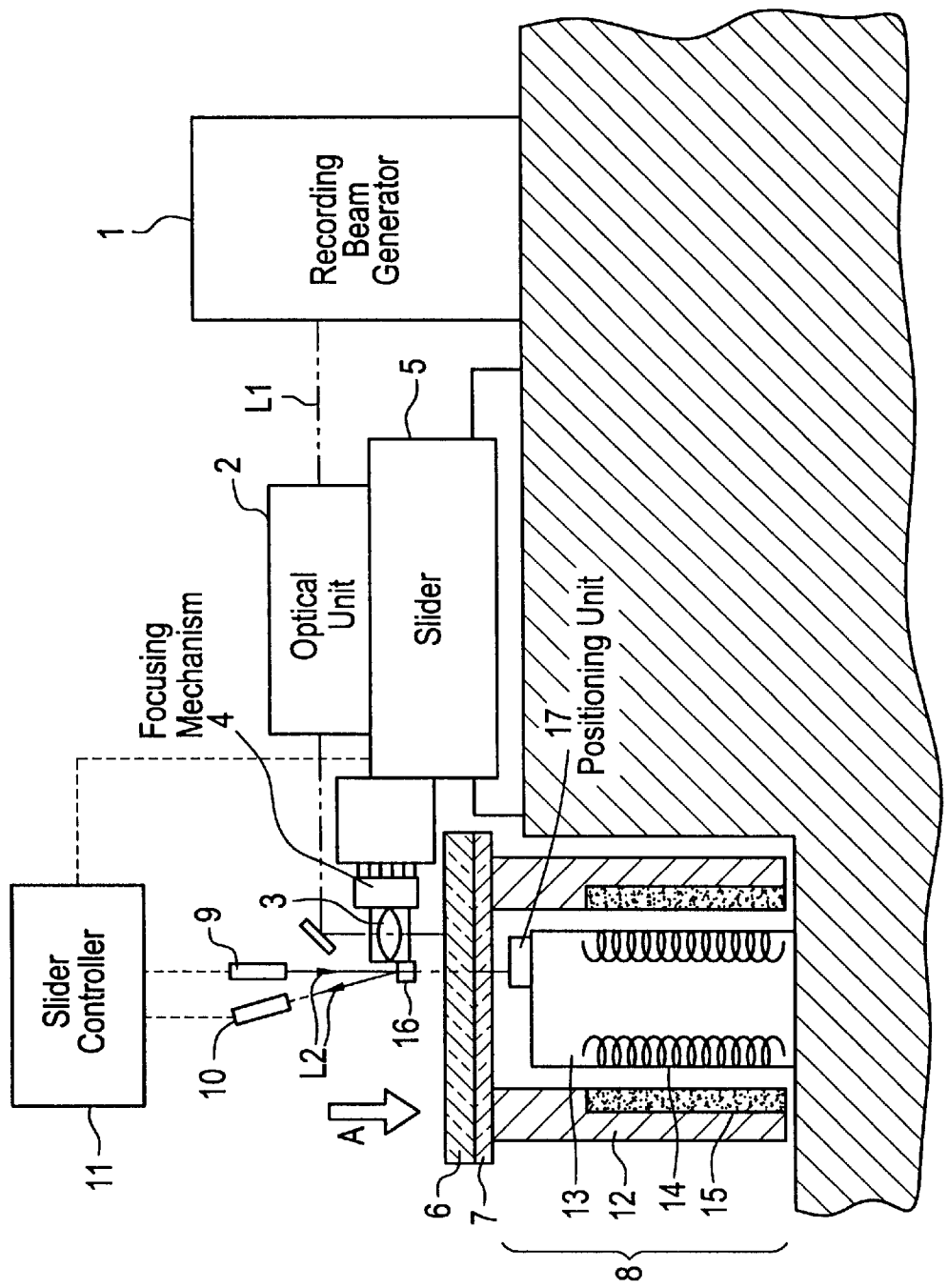
FIG. 3 is a block diagram showing a mastering apparatus according to the invention.

FIG. 3 is a block diagram showing the embodiment of the mastering apparatus according to the invention. In FIG. 3, elements which are the same as those shown in FIGS. 1 and 2 are indicated by the same reference numbers.

Figure 1:
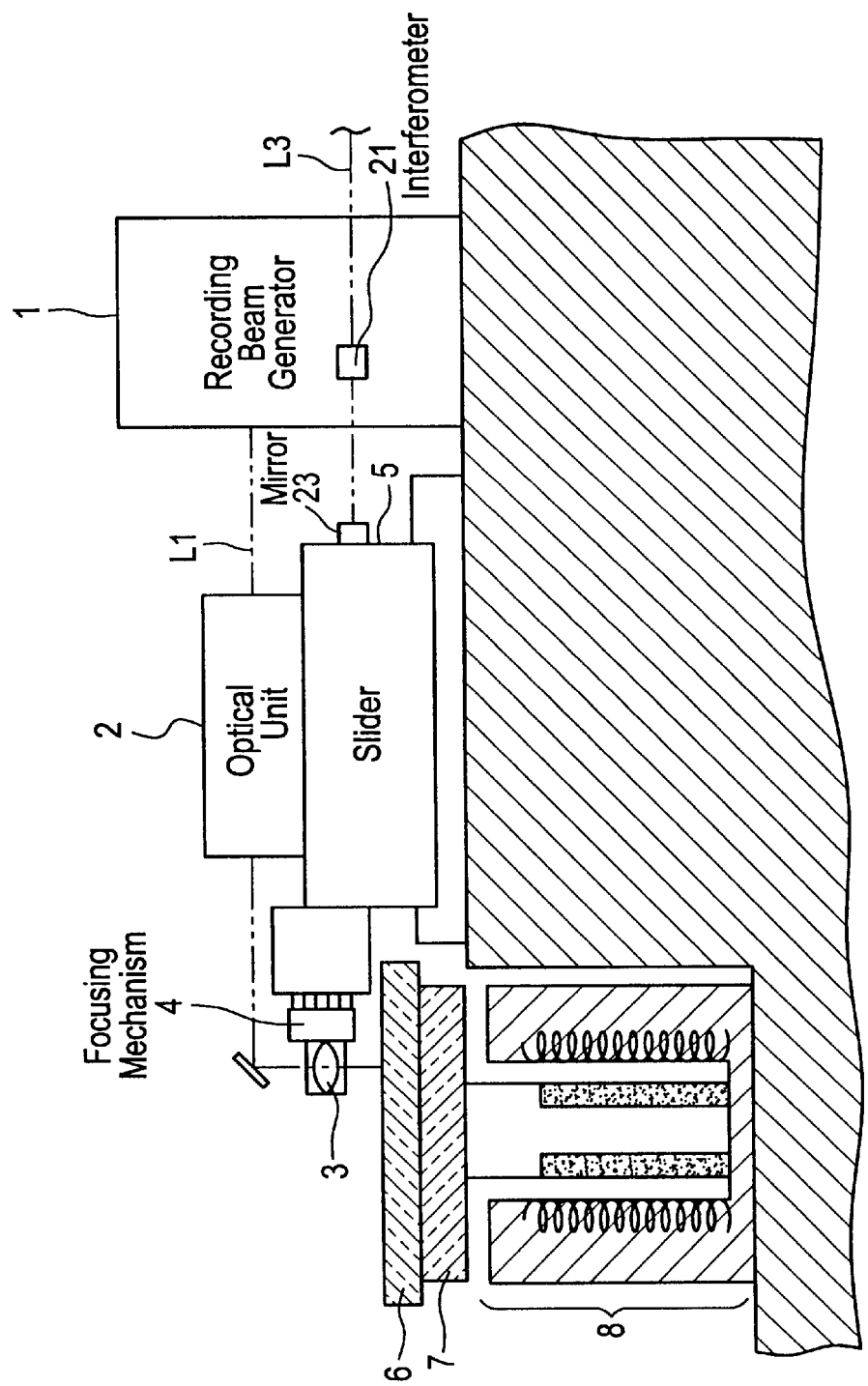
FIG. 1 shows a schematic configuration of one conventional mastering apparatus.

Like the apparatus shown in FIG. 1, the mastering apparatus in FIG. 3 includes a recording beam generator 1 for generating recording beam L1 in accordance with information to be recorded, an optical unit 2 for modulating the recording beam, an objective lens 3 for forming information signals by focusing the recording beam onto the glass master, a focusing mechanism 4 for controlling the movement of the objective lens 3 in a focusing direction (a direction of an optical axis of the objective lens) using a voice coil motor (not shown), a slider 5 for controlling the movement of the objective lens 3 in a tracking direction (a direction parallel with the recording surface of the glass master 6), a turn table 7 for rotating the transparent glass master 6 made of glass, and a spindle motor 8 for controlling the rotation of the turn table 7. Furthermore, the mastering apparatus in FIG. 3 includes a positioning beam emitter 9 for emitting a positioning beam L2 for measuring the position of the objective lens 3, a positioning beam detector 10 for detecting the positioning beam reflected or diffracted by positioning units 16 and 17 to be described later and a slider controller 11 for controlling a position of the slider 5 based on the result of reception of the beam by the positioning beam detector 10.

The spindle motor 8 includes a spindle rotating portion 12 and a spindle stationary portion 13. The spindle rotating portion 12 is disposed such that it surrounds the spindle stationary portion 13 and contacts the turn table 7. The spindle stationary portion 13 and spindle rotating portion 12 respectively include a coil 14 and a permanent magnet 15 between which electromagnetic induction is generated to rotate the spindle rotating portion 12 and turn table 7 integrally.

Figure 4A:
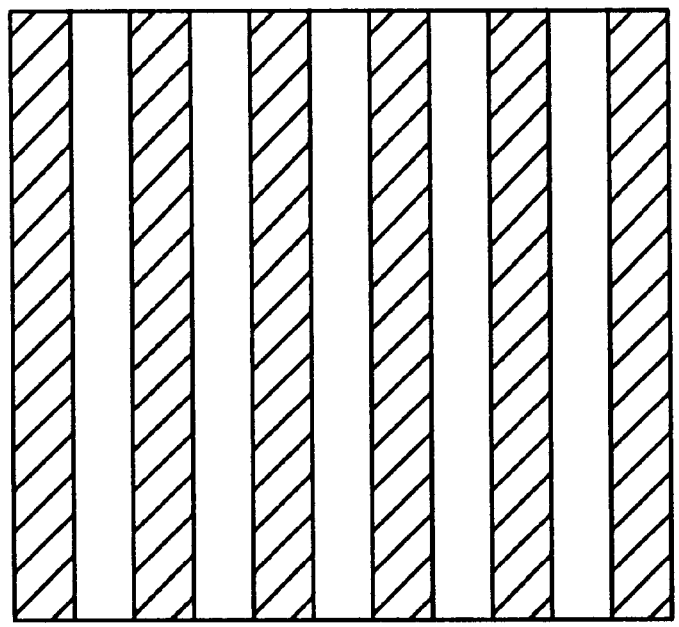
FIG. 4A illustrates an example of a stripe-like grid pattern.
Figure 4B:
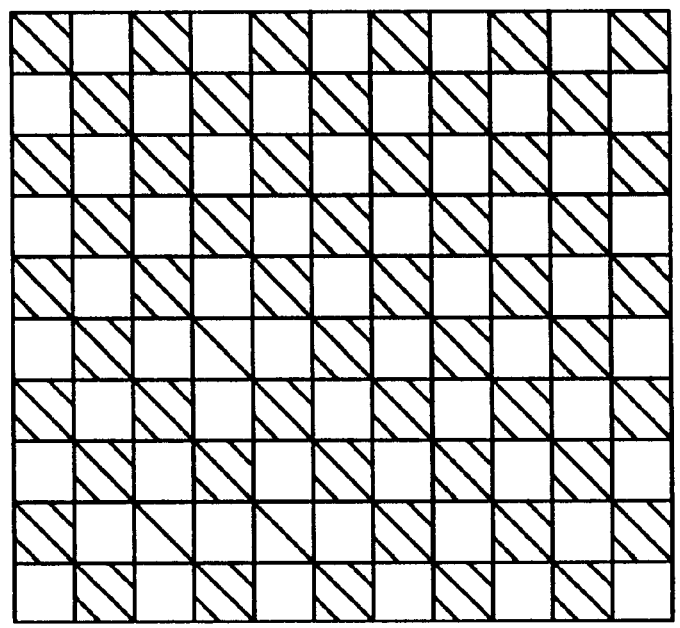
FIG. 4B illustrates an example of a checkerboard-like grid pattern.

The positioning unit 16 is mounted in a vicinity of an end of the objective lens 3, and the positioning unit 17 is mounted on an upper surface of the spindle stationary portion 13. For this reason, the positioning unit 16 is integrally movable with the objective lens 3 and the positioning unit 17 is independent of movements of the glass master 6 and the objective lens 3. In this embodiment, the positioning units 16 and 17 are formed by diffraction gratings. For example, the positioning unit 16 is formed in a stripe-like grid pattern as shown in FIG. 4A and the positioning unit 17 is formed in a checkerboard-like grid pattern as shown in FIG. 4B.

Figure 5:
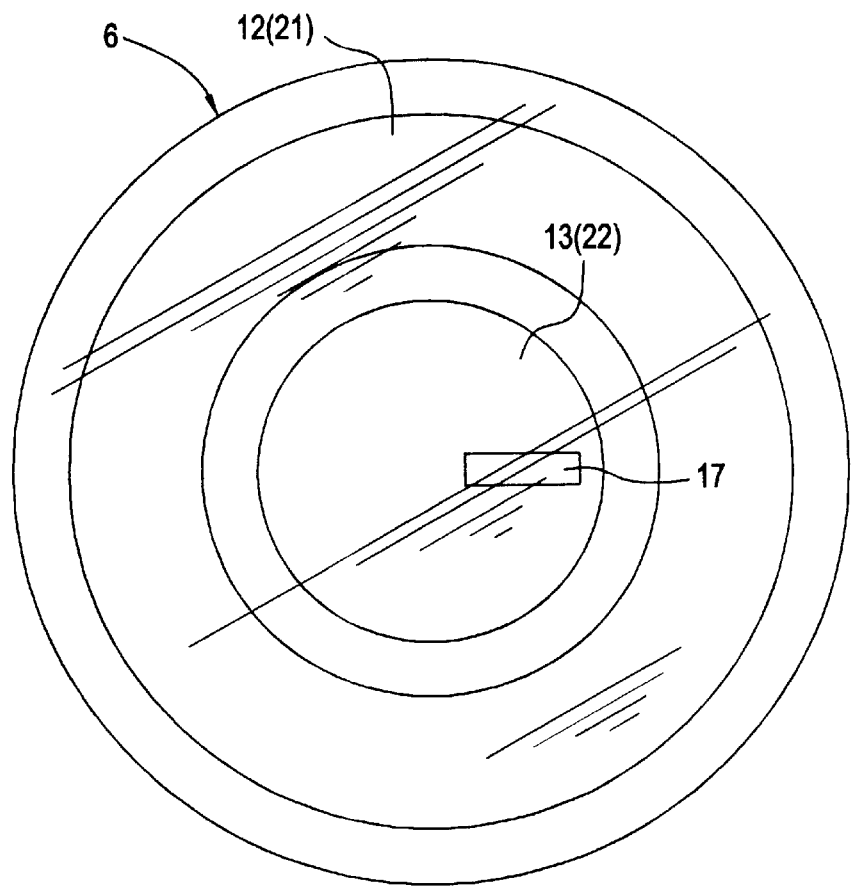
FIG. 5 is a plan view showing the turn table in FIG. 3 as viewed from above (in the direction A in FIG. 3).

FIG. 5 is a plain view showing the turn table 7 as viewed from above (in the direction A in FIG. 3). As illustrated, the spindle rotating portion 12 contacts directly with an unrecorded region 21 of the glass master 6, and the spindle stationary portion 13 faces directly to a recorded region 22 of the glass master 6. The positioning unit 17 is formed to extend straight from the center of the recorded region 22 to the periphery thereof.

A method for mastering optical information onto the glass master according to the present embodiment will now be described. The recording beam L1 output by the recording beam generator 1 is modulated by the optical unit 2 and is thereafter directed to the objective lens 3. The movement of the objective lens 3 is controlled by the slider 5 in the tracking direction, and by the focusing mechanism 4 in the focusing direction. As a result, the information signals of the recording beam L1 which have passed through the objective lens 3 are formed onto the glass master 6 on the turn table 7.

The glass master 6 is placed on the turn table 7 with its side coated with resist facing upwards and is rotated by the spindle rotating portion 12. By moving the slider 5 from the center of the glass master 6 toward the outer circumference thereof, a track made of pits is recorded in spiral form extending from the inner circumference to the outer circumference.

The positioning beam generator 9 emits positioning beam L2 continuously or periodically during exposure recording onto the glass master 6. The positioning beam L2 is diffracted by the positioning unit 16 mounted on the vicinity of a rim of the objective lens 3 to be incident upon the positioning beam detector 10. Similarly, a part of the positioning beam from the positioning beam generator 9 passes through the glass master 6 and is diffracted by the positioning unit 17 mounted on the upper surface of the spindle stationary portion 13 to be reflected into the positioning beam detector 10.

The positioning beam detector 10 detects relative positional deviation between the positioning units 16 and 17 based on the reflected and diffracted light as a result of the reflection and diffraction at the positioning units 16 and 17. The slider controller 11 controls the movement of the slider 5 in accordance with the relative positional deviation detected by the positioning beam detector 10. More specifically, the slider controller 11 moves the slider 5 such that relative positional deviation between the positioning members 16 and 17 equals a predetermined reference value. Such control over the movement of the slider 5 is continued throughout exposure recording onto the glass master 6.

While the positioning unit 16 in FIG. 3 can be moved up and down and to the right and left integrally with the objective lens 3, the positioning unit 17 is always in a fixed position. As a result, even if the objective lens 3 is moved in the tracking direction by the interactive movement that occurs when the objective lens 3 is moved up and down by the focusing mechanism 4, the distance of the movement can be accurately detected, and the position of the objective lens 3 can be accurately corrected based on the result of the detection.

Further, since the positioning unit 17 is provided close to the recorded region 22 of the glass master 6, a length of a light path of the positioning light L2 can be shortened. Since the diffracted beam is used to carry out the positional deviation processing, the fluctuations of the air and temperature hardly affect the positional deviation processing, and a positioning accuracy of the objective lens 3 can be always kept properly. In addition, since the objective lens 3 and positioning unit 16 are placed close to each other, there is less Abbe's error and the positional deviation of the objective lens 3 due to Abbe's errors is almost negligible.

Furthermore, since the positioning unit 17 has a checkerboard-like grid pattern as shown in FIG. 4B, it is possible to detect positional deviation of the objective lens 3 not only in the tracking direction but also in the focusing direction. When any positional deviation is detected in the focusing direction, the movement of the objective lens 3 may be controlled by the focusing mechanism 4 depending on the amount of the positional deviation. The related information concerning the positioning units 16 and 17 is disclosed for example in U.S. Pat. No. 4,848,911 and the information therein is applicable to the present invention. The entire contents of the USP are incorporated by reference.

The grid patterns for the positioning units 16 and 17 are not limited to those shown in FIGS. 4A and 4B. For example, the positioning unit 16 may have a checkerboard-like grid pattern as shown in FIG. 4B.

Instead of the above-described embodiment, a configuration may be employed to detect the relative positions of the positioning units 16 and 17 wherein the positioning beam L2 is diffracted by the positioning unit 16; the diffracted beam is further diffracted by the positioning unit 17; and the resultant diffracted beam is diffracted by the positioning unit 16 again to be incident upon the positioning beam detector 10.

While in the above-described embodiment, the position of the objective lens 3 is corrected, when near-field recording is to be performed using an SIL (Solid Immersion Lens) in addition to the objective lens 3, it is desirable to correct the position of the SIL together with the objective lens 3.

Figure 6:
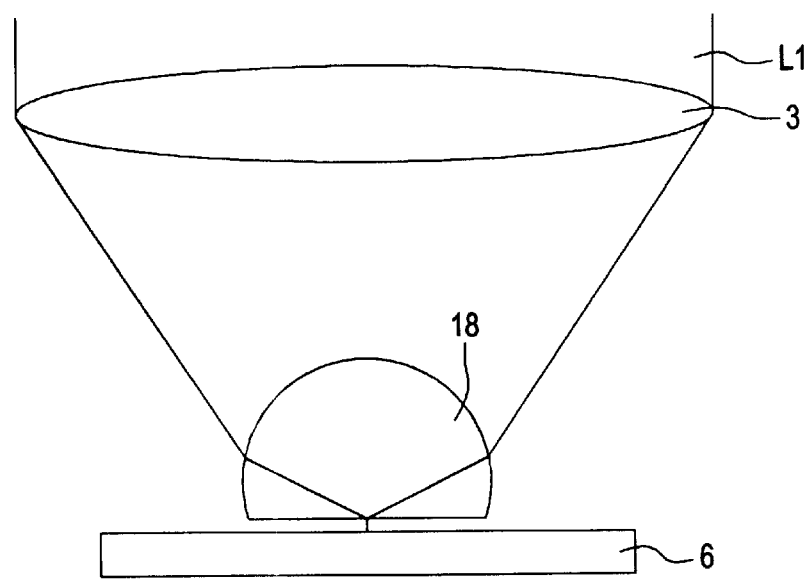
FIG. 6 illustrates an enlarged view showing an optical path of the present invention using an SIL (Solid Immersion Lens).

FIG. 6 illustrates an enlarged view showing an optical path of the present invention using the SIL 18. The SIL 18 is disposed between the objective lens 3 and the glass master 6, and is supported such that a distance to the surface of the glass master 6 is kept constant. Note that the SIL 18 is replaceable with other known types of SILs. The recording beam L1 passes through the objective lens 3 and enters the SIL 18 and radiates a fine or micro-profile beam spot from the bottom surface of the SIL 18 to a diameter of a sub-micrometer. This beam spot is the intended spot as formed originating from an evanescent wave, and the recording onto the glass master 6 can be done by the beam spot.

In general, a manufacture of commercial optical disks such as CD-ROMs and DVD-ROMs involves the fabrication of a master disk, and the commercial disks are fabricated by using the master disk by injection molding.

As described above, according to the present invention, the positioning beam is projected upon a first positioning unit movable with the objective lens and the second positioning unit secured independent of movements of the glass master and the objective lens, and the position of the objective lens is controlled based on a diffracted beam therefrom. This makes it possible to correct positional deviation due to an interactive movement of the objective lens accurately. Further, since the first positioning unit is disposed close to the objective lens and the second positioning unit is disposed close to the glass master, respectively, the movement of the objective lens can be accurately controlled without being affected by disturbances such as fluctuation of the air and the Abbe's errors.

The foregoing discussion discloses and describes merely an exemplary embodiment of the present invention. As will be understood by those skilled in the art, the present invention may be embodied in other specific forms without departing from the spirit or essential characteristics thereof. Accordingly, the disclosure of the present invention is intended to be illustrative, but not limiting, of the scope of the invention, which is set forth in the following claims. The entire contents of Japanese Patent Application H09-331584, filed Dec. 2, 1997, is incorporated herein by reference.

What is claimed is:

1. A mastering apparatus for recording optical information onto a glass master, comprising:
   a motor for rotating the glass master while recording;
   an objective lens for focusing a recording beam onto the glass master;
   a first positioning unit integrally movable with the objective lens;
   a second positioning unit secured independent of movements of the glass master and the objective lens;
   a beam emitting device for emitting a positioning beam to the second positioning unit through the first positioning unit;
   a beam detecting device for detecting the positioning beam passed through the first positioning unit and from the second positioning unit; and,
   a control unit for positioning the objective lens based on a signal detected by the beam detecting device.

2. A mastering apparatus according to claim 1, wherein the first positioning unit is disposed adjacent one surface of the glass master and the second positioning unit is disposed adjacent another surface of the glass master.

3. A mastering apparatus according to claim 2, wherein the glass master is positioned in a light path of the positioning beam.

4. A mastering apparatus according to claim 3, wherein the glass master is substantially transparent.

5. A mastering apparatus according to claim 1, further comprising a focus adjusting unit for adjusting the objective lens by moving along a focusing direction.

6. A mastering apparatus according to claim 5, wherein the control unit produces a signal which moves the objective lens along a direction perpendicular to the focusing direction so as to reduce an interactive movement which is generated when the focus adjusting unit moves the objective lens along the focusing direction.

7. A mastering apparatus according to claim 1, wherein both the first positioning unit and the second positioning unit include a diffraction grating.

8. A mastering apparatus according to claim 7, wherein the control unit detects displacement of the objective lens by referring to a diffracted beam passed through the first positioning unit and from the second positioning unit.

9. A method for mastering optical information onto a glass master, by forming a recording beam spot focused using an objective lens onto the glass master, comprising steps of:
   rotating the glass master;
   emitting a positioning beam to a first positioning unit and subsequently passing the positioning beam from the first positioning unit to a second positioning unit, the first positioning unit integrally movable with the objective lens, the second positioning unit secured independent of movements of the glass master and the objective lens emitting the recording beam spot onto the glass master;
   detecting the positioning beam passed through the first positioning unit and diffracted from the second positioning unit; and,
   controlling a position of the objective lens based on a signal detected by the detecting step, thereby controlling the position of the recording beam on the glass master.

10. A method according to claim 9, wherein the first positioning unit is disposed adjacent one surface of the glass master and the second positioning unit is disposed adjacent another surface of the glass master.

11. A method according to claim 10, wherein the glass master is in a light path of the positioning beam.

12. A method according to claim 11, wherein the glass master is substantially transparent.

13. A method according to claim 9, further comprising adjusting the objective lens by moving along a focusing direction.

14. A method according to claim 13, further comprises producing a signal which moves the objective lens along a direction perpendicular to the focusing direction so as to reduce an interactive movement which is generated when the objective lens moves along the focusing direction.

15. A method according to claim 9, wherein both the first positioning unit and the second positioning unit include a diffraction grating.

16. A method according to claim 15, further comprises detecting displacement of the objective lens by referring to a diffracted beam passed through the first positioning unit and from the second positioning unit.

17. A method of making an optical disk, by forming a recording beam spot focused using an objective lens, comprising steps of:
   rotating a glass master;
   emitting a positioning beam to a first positioning unit and subsequently passing the positioning beam from the first positioning unit to a second positioning unit, the first positioning unit integrally movable with the objective lens, the second positioning unit secured independent of movements of the glass master and the objective lens emitting the recording beam spot onto the glass master;
   detecting the positioning beam passed through the first positioning unit and diffracted from the second positioning unit;
   controlling a position of the objective lens based on a signal detected by the detecting step to manufacture the glass master thereby controlling the position of the recording beam spot on the glass master; and,
   fabricating the optical disk by using the manufactured glass master.

* * * * *